United States Patent
Frost et al.

(10) Patent No.: US 7,806,772 B2
(45) Date of Patent: Oct. 5, 2010

(54) HOMOKINETIC DISPLACEMENT JOINT

(75) Inventors: Sebastian Frost, Bindfelde (DE); John Sherlock, Wolverhampton (GB)

(73) Assignee: IFA Technologies GmbH, Haldensleben (DE)

( * ) Notice: Subject to any disclaimer, the term of this patent is extended or adjusted under 35 U.S.C. 154(b) by 369 days.

(21) Appl. No.: 11/973,402

(22) Filed: Oct. 9, 2007

(65) Prior Publication Data
US 2008/0085776 A1    Apr. 10, 2008

(30) Foreign Application Priority Data
Oct. 10, 2006   (DE) .................. 10 2006 047 769
Mar. 3, 2007    (DE) .................. 10 2007 010 352

(51) Int. Cl.
*F16D 3/227* (2006.01)

(52) U.S. Cl. ...................... 464/144; 464/906

(58) Field of Classification Search .............. 464/144, 464/906
See application file for complete search history.

(56) References Cited

U.S. PATENT DOCUMENTS 3,133,431 A *  5/1964  Zech ........................... 464/144
3,475,924 A * 11/1969  Aucktor ...................... 464/144
6,071,195 A    6/2000  Krude
6,468,164 B2 * 10/2002  Song ........................... 464/144
7,632,189 B2  12/2009  Schwärzler et al.
2010/0029395 A1  2/2010  Schwärzler et al.

FOREIGN PATENT DOCUMENTS

DE        197 04 761        8/1998
DE        199 58 147        6/2001
DE     10 2004 018 777       3/2005
WO      WO 2005/028895       3/2005

OTHER PUBLICATIONS

English translation of the International Preliminary Report on Patentability and Written Opinion of the International Searching Authority.

* cited by examiner

*Primary Examiner*—Greg Binda
(74) *Attorney, Agent, or Firm*—Collard & Roe, P.C.

(57) ABSTRACT

A homokinetic displacement joint for longitudinal shafts of motor vehicles, has an outer and inner joint body having ball raceways, a cage between the joint bodies, and balls provided in the individual pairs of ball raceways. The balls are guided in the cage and the ball raceways are provided in alternating sequence, alternately rising to the right and left, to form slanted, spatially arranged ball raceways in the assembled state of the joint bodies. The individual ball raceways possess a track slant angle β 8 and an incline angle β' 9 that are determined, relative to one another, by the ratio β:β'=5:3.

5 Claims, 5 Drawing Sheets

L1 = L2 = L3

HOMOKINETIC DISPLACEMENT JOINT

BACKGROUND OF THE INVENTION

1. Field of the Invention

The invention relates to a homokinetic displacement joint for longitudinal shafts of motor vehicles, consisting of an outer and inner joint body as well as a cage. Several balls are provided between the joint bodies and each ball is guided in tracks/grooves on the joint bodies, and held in a cage window of the cage. A torque can be transferred from the outer joint body onto the inner joint body, or from the inner joint body onto the outer joint body, using the balls.

2. The Prior Art

Displacement joints that are used in motor vehicles to transfer torques are well known. They consist of an outer and an inner joint body that are structured with tracks/grooves, and balls are provided in these grooves. The displacement joints are configured with cages or without cages. The transfer of the torque from one joint body to the other takes place by way of the balls inserted into the grooves.

Thus, German Patent No. DE 197 04 761 C2 describes a ball homokinetic joint in the form of a displacement joint in which two ball tracks adjacent to one another on the circumference of the outer joint part each have center lines that are parallel to one another, and form outer track pairs, and two ball tracks that are adjacent to one another on the circumference of the inner joint part each have center lines that are parallel to one another, and form inner track pairs. The outer and inner tracks pairs are assigned to one another and together accommodate a pair of balls. Two of the ball tracks in the inner joint part and the outer joint part are brought close to one another, so that the cage windows can be relatively lengthened there, where two tracks that run at opposite intersection angles to the longitudinal axis are adjacent to one another in a joint component, in the circumference direction. It is explained that it is an advantage that the existing residual ridge width between the extended cage windows does not become impermissibly narrow.

An axially displaceable homokinetic rotary joint having an outer joint body and an inner joint part as well as balls provided between these two components is described in European Patent No. EP 1 039 162 A2, in which each ball is guided in a track on the joint body, and held in a cage window of a cage. To reduce the occurrence of noise, a damping layer is provided on the inside surface of the joint body that can be brought into contact with the outside surface of the cage, and/or on the essentially radial insides of the cage windows. This eliminates the so-called "humming-buzzing" of homokinetic joints.

Also, displacement valves that do not have cages are known, as described in German Patent No. DE 199 58 147 A1, for example. This displacement joint relates to a homokinetic displacement joint consisting of an outer joint piece having exterior joint piece tracks, and an inner hub with exterior hub tracks that intersect the joint piece tracks. Joint piece tracks and hub tracks that correspond to one another each form a raceway track for a ball that transfers force. All of the raceways have a slant angle, relative to the first plane which is configured essentially the same size, for the related joint piece track and for each corresponding hub track, but in the opposite direction. Some of the raceways additionally have an incline angle with regard to a second plane, which is also configured essentially the same size for the related joint piece tracks and for each corresponding hub track, but in the opposite direction. This is supposed to bring about the result that all of the balls of the displacement joint are involved in the transfer of power.

It is a disadvantage of the known displacement joints that much production technology effort is required for their production, and that the ratio of the construction size of these displacement joints to their transfer capacity is very disadvantageous.

SUMMARY OF THE INVENTION

It is therefore an object of the invention to provide a homokinetic displacement joint configured with a relatively small cage for longitudinal shafts of motor vehicles, with which great torques and speeds of rotation can be transferred, and the disadvantages of the known solutions are essentially eliminated.

The invention therefore comprises a homokinetic displacement joint in which the two parts, the outer joint body and the inner joint body, are configured with ball raceways that are disposed in an alternating sequence in the left/right configuration, on the inner/outer circumference of the joint bodies. The individual ball raceways are configured with incline angles $\beta'$ that can be fixed and track slant angles $\beta$, which stand in a specific size ratio to one another. For example, according to the equation:

track slant angle $\beta$ to incline angle $\beta'$=5:3.

According to the invention, the track slant angles $\beta$ are configured with values in the range from 5° to 9°, and the incline angles $\beta'$ are configured with values in the range from 3° to 5.4°.

In the assembled state of the outer and inner joint body, in other words in the finished displacement joint, slanted, spatially disposed raceways are formed, in which smaller balls, as compared with known displacement joints, can be used, with intersecting ball raceways. This makes it possible to increase the number of balls and thus achieve a reduction in the Hertz pressure between the balls and the ball raceways, while the required control angle of the ball raceways remains sufficiently large, despite the increased number of balls, without any impairment of the function of the displacement joint. At the same time, the smaller balls reduce the centripetal forces, and thus once again the Hertz pressure in the ball raceways, and they do this at high speeds of rotation.

The ball raceways provided in the joint bodies in alternating sequence form the spatial slant in the assembled state of the joint bodies. Thus, In a preferred embodiment of the displacement joint, the latter can be structured with six to eight ball raceways.

The cage of the displacement joint can be configured with windows, in which one or even two balls find accommodation. In the zero position of the displacement joint, the ball raceways possess the same length distances, and the condition:

L1=L2=L3 ... Ln is fulfilled.

A significant advantage of the present invention is that the displacement joint can be configured with a larger number of balls, as compared with known displacement joints, because of the spatial slant of the ball raceways that are provided. Due to this, the running properties are improved, the Hertz pressure is reduced, and despite the increased number of balls in the displacement joint, the intersection angle of the raceways is large enough. Thus, the functional properties of the displacement joint are also not limited. The good running properties result from the pairing of the outer joint body and the inner joint body, which are configured with spatially opposite ball raceways.

A displacement joint configured in accordance with the invention possesses an assembly deflection angle up to 8°, an operational deflection angle in the range from 4 to 5°, an assembly displacement path of =>20 mm, and an operational displacement path of =>10 mm.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Referring now in detail to the drawings, FIGS. 1 to 10 show a homokinetic displacement joint in its totality, in other words in the installed state, as well as individual detail views and sectional views with regard to structural and functional components of the displacement joint.

Figure 1:
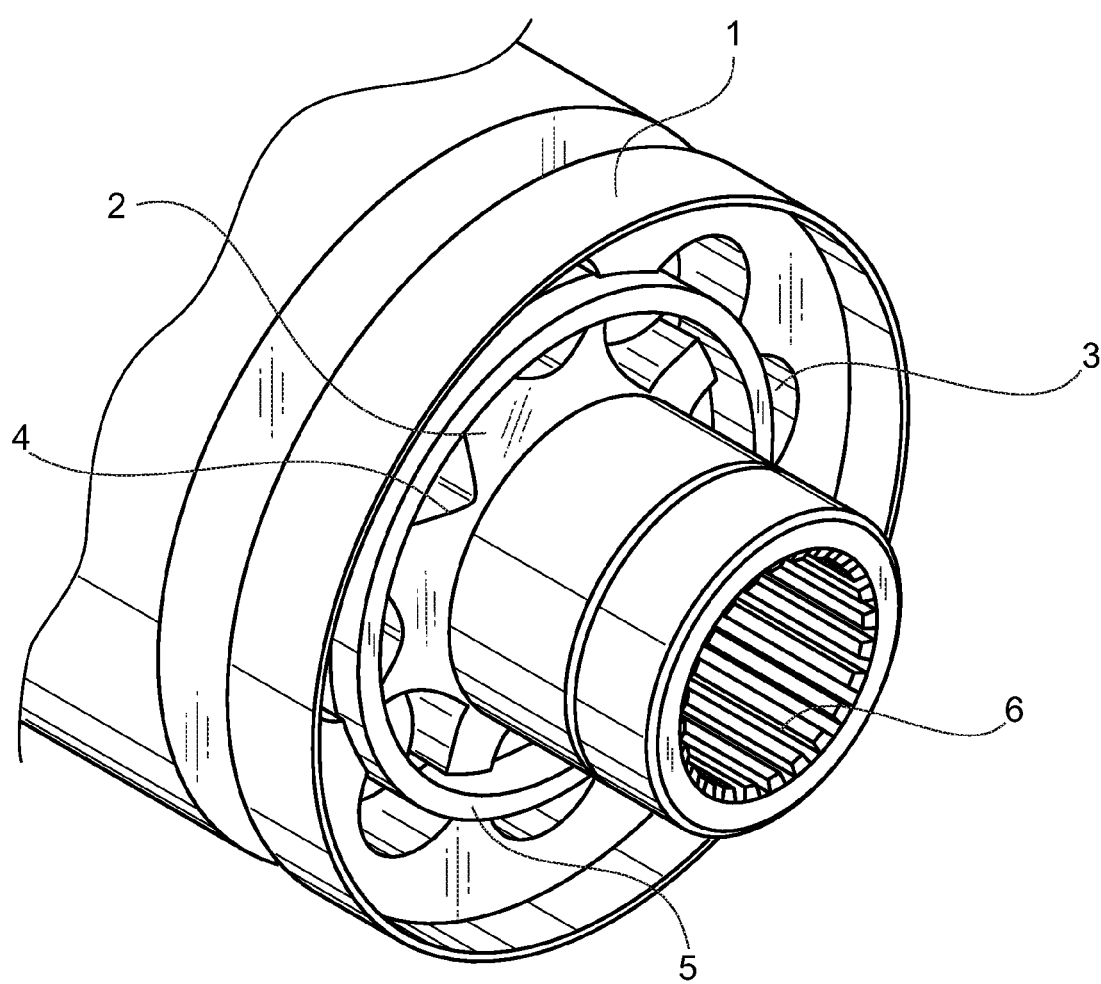
FIG. 1 shows a perspective view of a displacement joint according to one embodiment of the invention.

Thus, FIG. 1 shows an assembled homokinetic displacement joint, in a perspective view, which joint consists of an outer joint body 1 and an inner joint body 2, as well as a cage 5 provided between joint bodies 1, 2.

The inside wall of outer joint body 1 and the outside wall of inner joint body 2 are configured with ball raceways 3, 4, which result in ball raceways 3, 4 in the assembled state of joint bodies 1, 2, which run at a slant and are spatially configured. Balls 7 are guided in the windows of cage 5.

Figure 3:
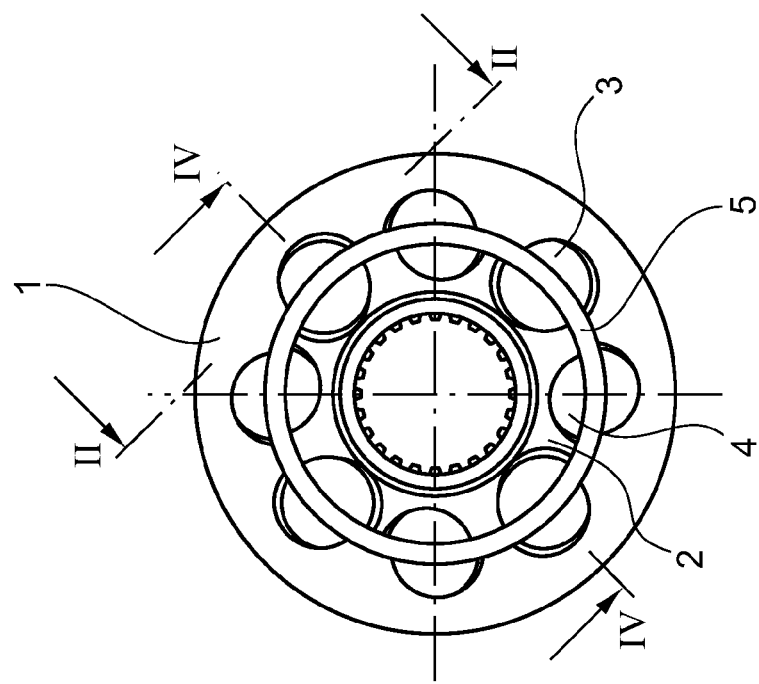
FIG. 3 shows a front view of the displacement joint according to FIG. 2.
Figure 2:
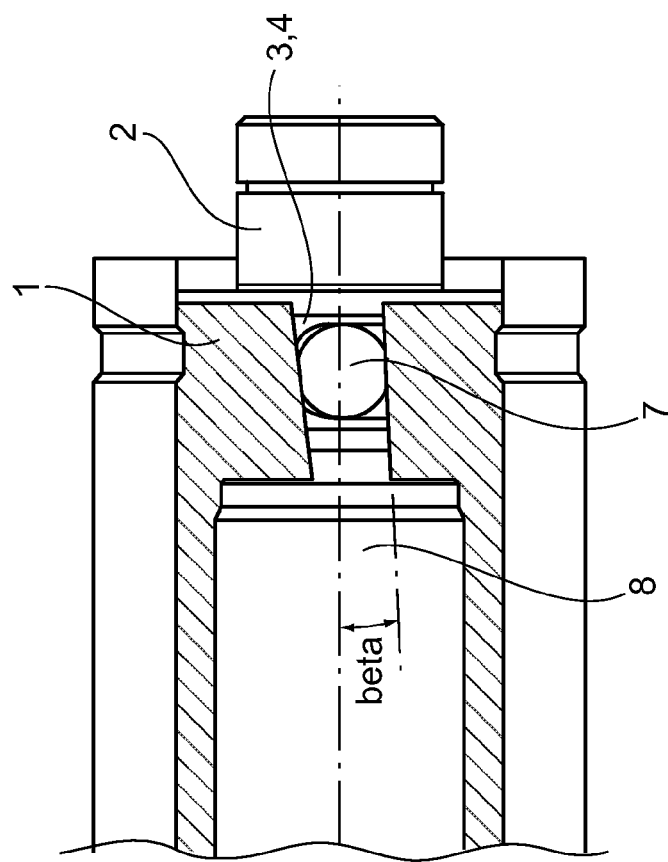
FIG. 2 shows a sectional view II-II according to FIG. 3.
Figure 4:
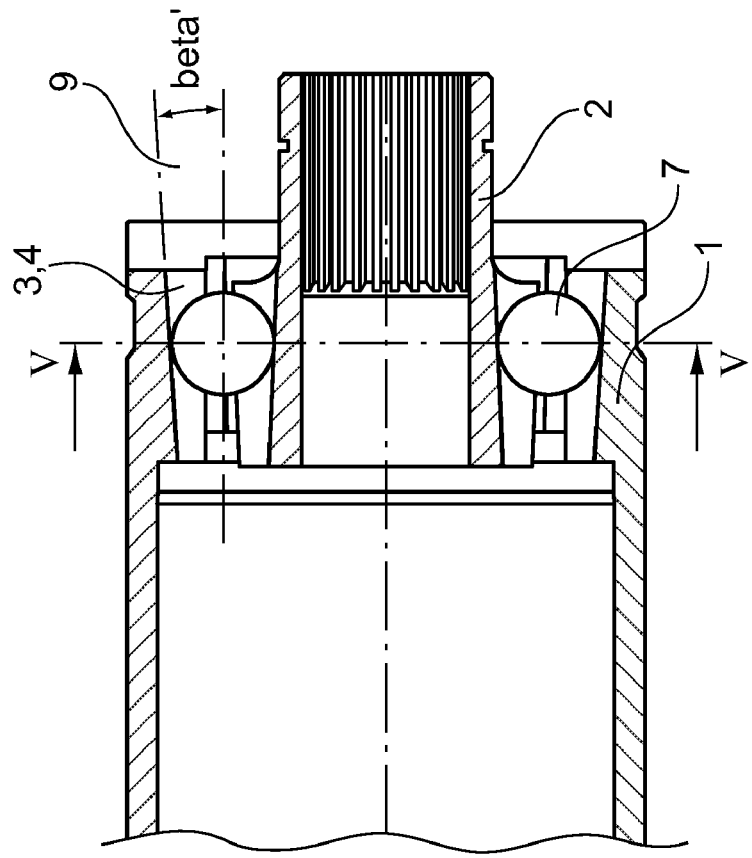
FIG. 4 shows a sectional view IV-IV according to FIG. 3.

Ball raceways 3, 4 provided in joint bodies 1, 2 are provided in alternating sequence in left/right configuration on the inside wall of outer joint body 1 and on the outside wall of inner joint body 2, while maintaining or establishing a specific incline angle β' 9 and a track slant angle β 8, as is evident from the views of FIGS. 1 and 2 and shown in FIGS. 3 and 4.

Figure 5:
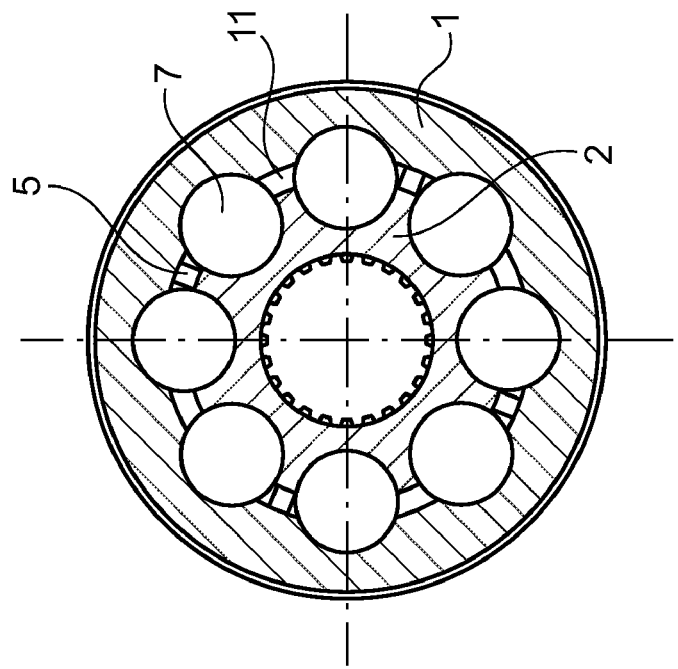
FIG. 5 shows a sectional view V-V according to FIG. 4.

Because of the configuration and disposition of the ball raceways 3, 4 in the outer and the inner joint body 1, 2, with the observance of specific incline angles and track slant angles 9, 8, the ball raceways 3, 4 are formed with a spatial slant, forming the basis that a homokinetic displacement joint with eight pairings of ball raceways 3, 4, for example, can be configured, as shown in FIGS. 1, 2 and 5.

This spatial slant of ball raceways 3, 4 is also the foundation and prerequisite for the fact that smaller balls 7 can be used in the displacement joint, thereby allowing the advantages already described above to become effective in practice, without the mobility of the homokinetic displacement joint being restricted.

The spatial slant of ball raceways 3, 4 results both from the alternating sequence of their left/right configuration on the individual joint bodies 1, 2 and from the individual track slant angles β 8 and incline angles βπ 9, which run in alternating sequence.

The configuration and the progression of the track slant angles β 8 and the incline angles β' 9 are evident from FIGS. 3 to 9, which show specific sectional views of the displacement joint and its outer and inner joint bodies 1, 2.

The sectional representations in FIGS. 3, 4 document the progression of the track slant angle β 8 and the incline angle β' 9, on the basis of a ball raceway 3, 4 and each inserted ball 7.

FIG. 5 shows the arrangement of eight balls 7 in the displacement joint, in a sectional view, in which the paired arrangement of balls 7 is also shown. In this configuration of the displacement joint, cage 5 is configured with enlarged cage windows 11, so that balls 7 are inserted and guided in pairs in these cage windows 11.

The individual views of FIGS. 6 to 9 show the alternating progression of the ball raceways 3, 4—left and right, respectively—as well as the configuration of the incline angles β' 9 and the track slant angles β 8 of the ball raceways 3, 4.

Figure 6:
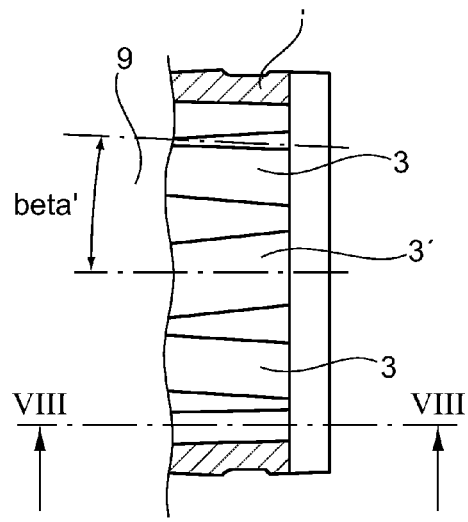
FIG. 6 shows the outer joint body according to an embodiment of the invention in a sectional representation.

Thus, it is evident from FIG. 6 how ball raceways 3 are provided in outer joint body 1, and run at a certain incline, documented by incline angles β' 9.

The alternating sequence of the left/right configuration of ball raceways 3 in outer joint body 1 is documented by the identification of ball raceways 3 and 3'.

Figure 7:
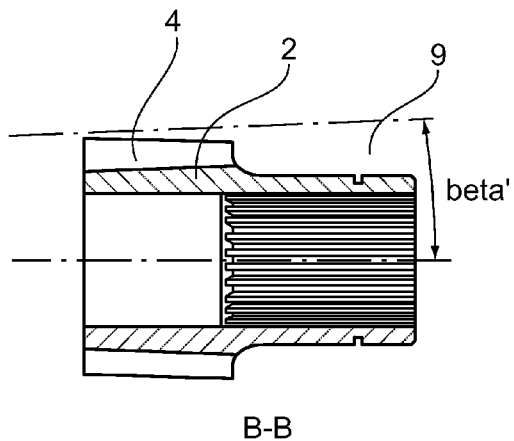
FIG. 7 shows the inner joint body in a sectional view VII-VII according to FIG. 9.

The alternating or opposite-direction configuration of incline angles β' 9 in the outer joint body 1 and in the inner joint body 2 is evident from the two representations of FIGS. 6 and 7; they then form the incline angle β' 9 of each ball raceway of the displacement joint as a whole, in the installed state.

Figure 8:
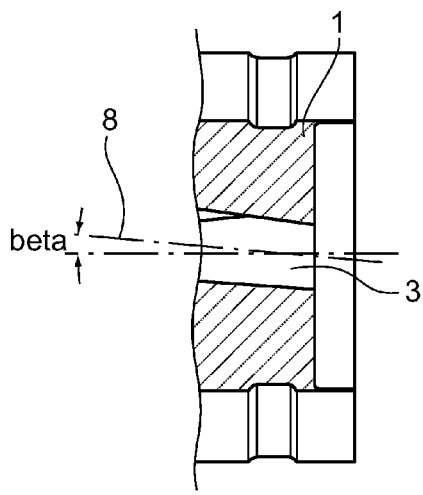
FIG. 8 shows the outer joint body in a sectional view VIII-VIII according to FIG. 6.
Figure 9:
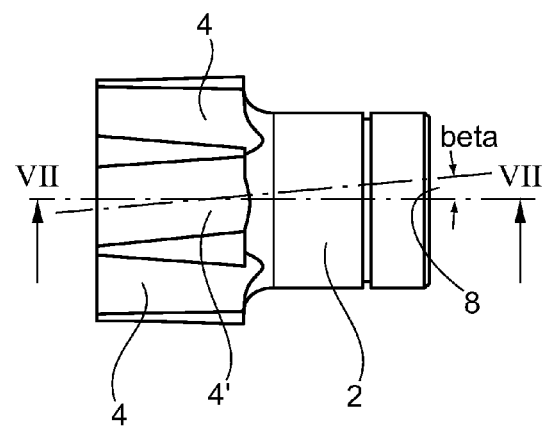
FIG. 9 shows the inner joint body in an individual representation.

Analogously, ball raceways 3, 4 of outer and inner joint bodies 1, 2 are each formed with track slant angle β 8, as shown in FIGS. 8 and 9. From these representations, it is evident how individual ball raceways 3, 4 are configured in alternating sequence with track slant angles β 8, which run alternatively inclined towards the front and inclined towards the rear, in the broadest sense, and result in the common track slant angle β 8 of each ball raceway in the assembled state of the two joint bodies 1, 2.

Figure 10:
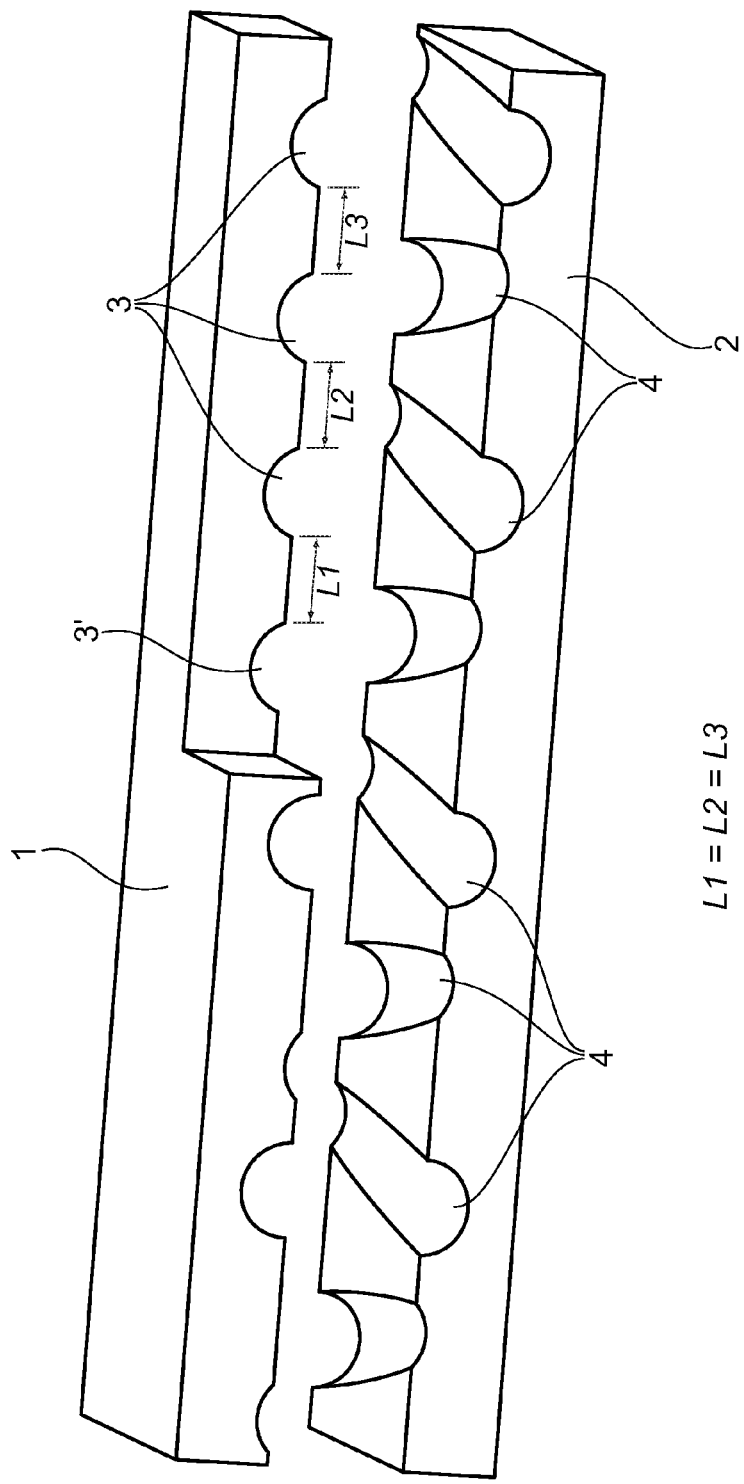
FIG. 10 shows a fundamental representation of the outer and inner joint body in a stretched configuration, with the arrangement and configuration of the ball raceways.

The configuration and arrangement of individual ball raceways 3, 4 in joint bodies 1, 2 are evident from the fundamental representation of the two joint bodies 1, 2 according to FIG. 10, in which it is also shown that individual ball raceways 3, 4 are configured with the same length distances relative to one another, according to the condition $$L1=L2=L3\ldots Ln.$$

The arrangement and progression of the individual ball raceways 4 are especially evident from the representation of inner joint body 2, how they are disposed running lengthwise and right in the joint body 2, and possess an incline angle β' 9 that is structured in alternating sequence, alternately running to the front and to the rear, as documented by ball raceways 4'.

Ball raceway 3 of joint body 1 that belongs to ball raceway 4 of joint body 2 is configured the opposite way, which means that related ball raceway 3 is configured to go with a ball raceway 4 that is inclined to the front, at an incline angle β' 9 that runs inclined to the rear, and each track slant angle β 8 of ball raceway 3 runs analogous to this.

The arrangement of raceways 3, 4 in alternating incline of the spatially slanted ball raceways, at the same angles, brings advantages in the production of displacement joints and their use in longitudinal shafts of motor vehicles.

For example, the tool performs the same movement in each production step for forming the ball raceways. In the first machining step, every other ball raceway is produced and then, in the second step, the tool is re-chucked, re-positioned, and the other ball raceways can be produced. This means that the same work process can take place once again, without setting the tool up again.

By means of the configuration of the track slant angle β and the incline angle β' according to the ratio β:β'=5:3, the foundation is given to create a displacement joint for longitudinal shafts with great displacement paths and small deflection angles, and by the use of small balls in displacement joints produced in this manner, the transfer of the required torques of longitudinal shafts for motor vehicles is not negatively influenced, while reducing the Hertz pressure.

Accordingly, while only a few embodiments of the present invention have been shown and described, it is obvious that many changes and modifications may be made thereunto without departing from the spirit and scope of the invention.

What is claimed is:

1. A homokinetic displacement joint for longitudinal shafts of motor vehicles, comprising:
    an outer joint body;
    an inner joint body, each of the inner and outer joint bodies having ball raceways aligned in pairs;
    a cage provided between the joint bodies; and
    balls provided in the individual pairs of ball raceways and guided in the cage;
    wherein the ball raceways are angled with respect to an axis of rotation of the joint in oppositely slanted inclines, in an alternating sequence, to the right and left of a line parallel to the axis by a track slant angle β, and above and below a line parallel to the axis by an incline angle β', so that in an assembled state of the joints, the ball raceways are slanted with respect to the axis of rotation and spatially arranged, and
    wherein the track slant angle β and the incline angle β' are determined, relative to one another, by the ratio

β:β'=5:3.

2. A displacement joint according to claim 1, wherein the track slant angles β are configured with values in the range from 5° to 9°, and the incline angles β' are configured with values in the range from 3° to 5.4°.

3. A displacement joint according to claim 1, wherein there is a section of the displacement joint where the raceways exhibit no axial displacement, circumference distances between the ball raceways are equally great, and a condition L1=L2=L3 ... Ln is fulfilled, wherein L is a distance between two ball raceways.

4. A displacement joint according to claim 1, wherein the cage is configured with windows in which one or two balls are accommodated.

5. A homokinetic displacement joint for longitudinal shafts of motor vehicles, comprising:
    an outer joint body;
    an inner joint body, each of the inner and outer joint bodies having ball raceways aligned in pairs;
    a cage provided between the joint bodies; and
    balls provided in the individual pairs of ball raceways and guided in the cage;
    wherein the ball raceways are angled with respect to an axis of rotation of the joint with oppositely slanted inclines, in an alternating sequence, to the right and left of a line parallel to the axis by a track slant angle β, and above and below a line parallel to the axis by an incline angle β', so that in an assembled state of the joint, the ball raceways are slanted with respect to the axis of rotation and spatially arranged.

* * * * *